United States Patent [19]

Faber et al.

[11] Patent Number: 5,125,076

[45] Date of Patent: Jun. 23, 1992

[54] SYSTEM FOR ROUTING MESSAGES IN A VERTEX SYMMETRIC NETWORK BY USING ADDRESSES FORMED FROM PERMUTATIONS OF THE TRANSMISSION LINE INDICEES

[75] Inventors: Vance Faber; James W. Moore, both of Los Alamos, N. Mex.

[73] Assignee: The United States of America as represented by the Department of Energy, Washington, D.C.

[21] Appl. No.: 488,445

[22] Filed: Feb. 27, 1990

Related U.S. Application Data

[63] Continuation of Ser. No. 209,238, Jun. 20, 1988, abandoned.

[51] Int. Cl.⁵ .............................................. G06F 13/00
[52] U.S. Cl. .............................. 395/200; 364/242.94; 364/242.95; 364/284.3; 364/222.2; 364/DIG. 1; 371/8.2; 370/94.3
[58] Field of Search ... 364/200 MS File, 900 MS File; 371/11.1, 11.2, 2.2, 8.2, 68.2, 68.3; 370/92, 99, 94.1, 94.3

[56] References Cited

U.S. PATENT DOCUMENTS

| | | | |
|---|---|---|---|
| 4,466,060 | 8/1984 | Riddle | 364/200 |
| 4,706,080 | 11/1987 | Sincoskie | 340/825.02 |
| 4,736,363 | 4/1988 | Aubin | 370/60 |
| 4,742,511 | 5/1988 | Johnson | 370/94 |
| 4,744,028 | 5/1988 | Karmarkar | 364/402 |
| 4,747,073 | 5/1988 | Desbois et al. | 364/900 |
| 4,748,660 | 5/1988 | Deveze | 364/514 |
| 4,769,771 | 9/1988 | Lippmann | 364/200 |
| 4,797,882 | 1/1989 | Maxemchuk | 370/60 |
| 4,814,978 | 3/1989 | Dennis | 364/200 |
| 4,831,518 | 5/1989 | Yu et al. | 364/200 |
| 4,835,674 | 5/1989 | Collins | 364/200 |

OTHER PUBLICATIONS

A Group Theoretic Model for Symmetric Interconnection Networks, by Sheldon B. Akers et al., 1986, IEEE.
Makoto Imase et al., "A Design for Directed Graphs with Minimum Diameter," IEEE Trans. Comput. C-32 No. 8, 782-784 (Aug. 1983).
J. C. Bermond et al., "Strategies for Interconnection Networks: Some Methods from Graph Theory," J. Parallel and Distributed Comput. 3, 433-449 (1986).
Gert Sabidussi, "Vertex-Transitive Graphs," Montash. Math. 68, 426-438 (1969).
William J. Dally et al., "Deadlock-Free Message Routing in Multiprocessor Interconnection Networks," IEEE Trans. Comp. C-36, No. 5, 547-553 (May 1987).
V. Faber, "Latency and Diameter in Sparsely Populated Processor Interconnection Networks: A Time and Space Analysis," Los Alamos National Laboratory Report LA-UR-87-3635.
V. Faber, "Global Communication Algorithms for Hypercubes and Other Cayley Coset Graphs," Los Alamos National Laboratory report LA-UR-87-3136.

Primary Examiner—Thomas C. Lee
Assistant Examiner—Eric Coleman
Attorney, Agent, or Firm—Ray G. Wilson; Paul D. Gaetjens; William R. Moser

[57] ABSTRACT

A network of interconnected processors is formed from a vertex symmetric graph selected from graphs $\Gamma_d(k)$ with degree d, diameter k, and $(d+1)!/(d-k+1)!$ processors for each $d \geq k$ and $\Gamma_d(k,-1)$ with degree $3-1$, diameter $k+1$, and $(d+1)!/(d-k+1)!$ processors for each $d \geq k \geq 4$. Each processor has an address formed by one of the permutations from a predetermined sequence of letters chosen a selected number of letters at a time, and an extended address formed by appending to the address the remaining ones of the predetermined sequence of letters. A plurality of transmission channels is provided from each of the processors, where each processor has one less channel than the selected number of letters forming the sequence. Where a network $\Gamma_d(k,-1)$ is provided, no processor has a channel connected to form an edge in a direction $\delta_1$. Each of the channels has an identification number selected from the sequence of letters and connected from a first processor having a first extended address to a second processor having a second address formed from a second extended address defined by moving to the front of the first extended address the letter found in the position within the first extended address defined by the channel identification number. The second address is then formed by selecting the first elements of the second extended address corresponding to the selected number used to form the address permutations.

12 Claims, 9 Drawing Sheets

Vertex Symmetric Communications Network
$\Gamma_d(k)$

Table of Processors

| k / d | 2 | 3 | 4 | 5 | 6 | 7 | 8 | 9 | 10 | 11 | 12 |
|---|---|---|---|---|---|---|---|---|---|---|---|
| 2 | 6 | | | | | | | | | | |
| 3 | 12 | 24 | | | | | | | | | |
| 4 | 20 | 60 | 120 | | | | | | | | |
| 5 | 30 | 120 | 360 | 720 | | | | | | | |
| 6 | 42 | 210 | 840 | 2,520 | 5,040 | | | | | | |
| 7 | 56 | 336 | 1,680 | 6,720 | 20,160 | 40,320 | | | | | |
| 8 | 72 | 504 | 3,024 | 15,120 | 60,480 | 181,440 | 362,880 | | | | |
| 9 | 90 | 720 | 5,040 | 30,240 | 151,200 | 604,800 | 1,814,400 | 3,628,800 | | | |
| 10 | 110 | 990 | 7,920 | 55,440 | 332,640 | 1,663,200 | 6,652,800 | 19,958,400 | 39,916,800 | | |
| 11 | 132 | 1,320 | 11,880 | 95,040 | 665,280 | 3,991,680 | 19,958,400 | 79,833,600 | 239,500,800 | 479,001,600 | |
| 12 | 156 | 1,716 | 17,160 | 154,440 | 1,235,520 | 8,648,640 | 51,891,840 | 259,459,200 | 1,037,836,800 | 3,113,510,400 | 6,227,020,800 |
| 13 | 182 | 2,184 | 24,024 | 240,240 | 2,162,160 | 17,297,280 | 121,080,960 | 726,485,760 | 3,632,428,800 | 14,529,715,200 | 43,589,145,600 | d = Number of transmission lines to each processor in network k = Maximum of minimum transmission lines between any two processors

*Fig. 1*

Vertex Symmetric Communications Network

$\Gamma_d(k,-1)$

Table of Processors

| d-1 \ k+1 | 5 | 6 | 7 | 8 | 9 | 10 | 11 | 12 | 13 |
|---|---|---|---|---|---|---|---|---|---|
| 3 | 120 | | | | | | | | |
| 4 | 360 | 720 | | | | | | | |
| 5 | 840 | 2,520 | 5,040 | | | | | | |
| 6 | 1,680 | 6,720 | 20,160 | 40,320 | | | | | |
| 7 | 3,024 | 15,120 | 60,480 | 181,440 | 362,880 | | | | |
| 8 | 5,040 | 30,240 | 151,200 | 604,800 | 1,814,400 | 3,628,800 | | | |
| 9 | 7,920 | 55,440 | 332,640 | 1,663,200 | 6,652,800 | 19,958,400 | 39,916,800 | | |
| 10 | 11,880 | 95,040 | 665,280 | 3,991,680 | 19,958,400 | 79,833,600 | 239,500,800 | 479,001,600 | |
| 11 | 17,160 | 154,440 | 1,235,520 | 8,648,640 | 51,891,840 | 259,459,200 | 1,037,836,800 | 3,113,510,400 | 6,227,020,800 |
| 12 | 24,024 | 240,240 | 2,162,160 | 17,297,280 | 121,080,960 | 726,485,760 | 3,632,428,800 | 14,529,715,200 | 43,589,145,600 | d = One more than least number of transmission lines from each processor k = One less than the maximum of minimum transmission lines between any two processors

*Fig. 2*

Communications Network
◯ Electronic processor
-◯- Transmission line

SYSTEM FOR ROUTING MESSAGES IN A VERTEX SYMMETRIC NETWORK BY USING ADDRESSES FORMED FROM PERMUTATIONS OF THE TRANSMISSION LINE INDICEES

This invention is the result of a contract with the Department of Energy (Contract No. W-7405-ENG-36).

This is a continuation of application Ser. No. 209,238 filed Jun. 20, 1988 now abandoned.

BACKGROUND OF THE INVENTION

This invention is generally related to interconnection networks for massively parallel computer systems and, more particularly, to vertex symmetric networks with simple routing schemes through these networks.

Parallel computer systems are generally composed of many processors which communicate through an interconnection network. This network can be represented by a graph: a collection of nodes which represent the processors and edges which represent the wires which connect pairs of processors. It is highly desirable to be able to construct interconnection networks which have as many nodes as possible, given a fixed degree (the number of wire pairs connected to each node) and diameter (the maximum number of wires a message must traverse to get between any two processors). It is generally shown by W. G. Bridge et al., "On the Impossibility of Directed Moore Graphs," J. of Comb. Theory 29, 339-341 (1980), that a directed graph with degree d and diameter k can have at most $n_{max} = d^k + d^{k+1} + \ldots + d$ nodes. In M. Imase et al., "A Design for Directed Graphs With Minimum Diameter," IEEE Trans. Comp. C-32, 782-784 (1983) graphs are constructed which have n nodes, degree d, and diameter at most k+1 for all $n \leq n_{max}$.

In a parallel processor system, it would be desirable for the network to have vertex symmetry, i.e., any node in the network looks essentially like any other node, wherein the routing algorithm is identical for each node in the network. Some of the graphs taught by the Imase reference have vertex symmetry and the desirable properties of vertex symmetry have been noted, see e.g., J. C. Bermond et al., "Strategies for Interconnection Networks: Some Methods from Graph Theory," J. Parallel Distributed Computing 3, 433-449 (1986).

It would also be desirable to easily expand parallel networks to add additional processors. Such a characteristic would enable a core network to be expanded or several core networks to be interconnected. It would be further desirable for message routing through the network to be accomplished using only simple algorithms for determining the routing path through the network. It is also desirable to minimize the number of routing steps which must be traversed along a routing path between a source processor and a destination processor.

These problems and others are addressed by the present invention, wherein a vertex symmetric routing network is provided for a plurality of processors to enable a shortest routing path through the network to be obtained.

Accordingly, it is an object of the present invention to provide networks having the smallest diameter known for a given degree.

Another object of the present invention is to require relatively simple routing algorithms at each processor for transmitting messages through the system.

Yet another object is to provide identical nodes throughout the network, i.e., each node has the same number of interconnection wires and the routing algorithm is identical for each node in the network.

Still another object of the present invention is to enable the subject networks to be expanded by only simple modifications to the networks.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise, in one characterization, a network for connecting a plurality of processors for cooperative interaction. The network is defined by a plurality of message transmission paths configured in a vertex symmetric graph selected from graphs $\Gamma_d(k)$ with degree d, diameter k, and $(d+1)!/(d-k+1)!$ processors for each $d \geq k$ and $\Gamma(k,-1)$ with degree $d-1$, diameter $k+1$, and $(d+1)!/(d-k+1)!$ processors for each $d \geq k \geq 4$.

In another characterization of the invention, a network is provided for connecting a plurality of processors for cooperative interaction, where each of the processors has an address formed by one of the permutations from a predetermined sequence of letters chosen a selected number at a time, and an extended address formed by appending to the address the remaining ones of the predetermined sequence of letters. A plurality of transmission channels is provided from each of the processors, where each processor has one less channel than the selected number of letters forming the sequence. Where a network $\Gamma_d(k,-1)$ is provided, no processor has a channel connected to form an edge in a direction $\delta_1$. Each of the channels has an identification number selected from the sequence of letters and connected from a first processor having a first extended address to a second processor having a second address formed from a second extended address defined by moving to the front of the first extended address the letter found in the position within the first extended address identified by the channel identification number. The second address is then formed by selecting the first elements of the second extended address corresponding to the selected number used to form the address permutations.

In yet another characterization of the present invention a process is provided for forming a routing path between a source processor address and a destination processor address. The plurality of processors are connected in a network defined by a vertex symmetric graph selected from graphs $\Gamma_d(k)$ with degree d, diameter k, and number of processors $(d+1)!/(d-k+1)!$, $d \geq k$ and $\Gamma_d(k,-1)$ with degree $d-1$, diameter $k+1$, and a number of processors $(d+1)!/(d-k+1)!$, $d \geq k \geq 4$. An address is assigned to each processor formed by one of the permutations of a sequence of letters chosen a selected number at a time and an extended address is formed by appending to the address the remaining ones of the sequence of letters. A plurality of transmission channels is then provided from each processor, with each channel having an identification number selected from the set of numbers one less than the number of letters in the sequence. Each channel is connected from one processor having a first extended address to a second processor having a second address formed from a second extended address defined by moving to the front of the first extended address the letter found in the position within the first extended address identified by the channel identification number. The second address is then formed by selecting the first selected number of letters in the second extended address, provided that the network formed by said graph $\Gamma_d(k-1)$ has no channel connections corresponding to edges of said graph $\Gamma_d(k)$ having a direction $\delta_1$.

BRIEF DESCRIPTION OF THE DRAWINGS

The accompanying drawings, which are incorporated in and form a part of the specification illustrate the embodiments of the present invention and, together with the description, serve to explain the principles of the invention. In the drawings.

DETAILED DESCRIPTION OF PREFERRED EMBODIMENTS

In accordance with the present invention, a network of processors is interconnected to provide the smallest maximum number of wire paths a message must traverse to get between any two processors for a given number of wire pairs connected to each processor. The network is configured to form vertex symmetric graphs $\Gamma_d(k)$ with degree d (the number of wire pairs connected to each processor, or node), diameter k (the maximum number of wires a message must traverse to get between any two processors), and $(d+1)!/(d-k+1)!$ nodes (processors) for each $d \geq k$ or graphs $\Gamma_d(k,-1)$ with degree $d-1$, diameter $k+1$, and $(d+1)!/(d-k+1)!$ nodes (processors) for each $d \geq k \geq 4$.

The present invention includes the following definitions and theorems which provide the necessary system conditions:

(1) Definition. Let G be a group, H a subgroup, and $\Delta$ a subset. Suppose (i) $G = <\Delta \cup H>$, (ii) $H\Delta H \subseteq \Delta H$ (iii) $\Delta$ is a set of distinct nonidentity coset representatives of H in G. Then the Cayley coset graph $\Gamma = (G,\Delta,H)$ can be formed with vertices $\{gH : g \in G\}$ and an edge $(g_1H, g_2H)$ whenever $g_2H = g_1\delta H$ for some $\delta \in \Delta$.

(2) Fact. Suppose $g'_2H = g_2H$ and $g'_1H = g_1H$. Then there exists $\delta' \in \Delta$ such that $g'_2H = g'_1\delta'H$.

(3) Corollary. $\Gamma$ is connected and the degree is $|\Delta|$.

(4) Definitions. Let G be any k-transitive group on $d+1$ letters; $T_k = \{0,1,2 \ldots , k-1\}$. Choose $\delta_\alpha \in G$ $(\alpha \neq 0)$ so that $$\delta_\alpha(0) = \alpha,$$

$$\delta_\alpha(0) = \alpha,$$

$$\delta_\delta(j) = \begin{cases} j-1 \text{ for } 1 \leq j \leq \alpha \\ \\ j \text{ for } j > \alpha \end{cases}, 1 \leq j \leq k-1.$$

Let $\Delta = \{\delta_\alpha | \alpha \neq 0\}$ and $H = \{h | hT_k = \text{identity}\}$. Cosets of H in G are denoted by k-tuples $(g_0, g_1, \ldots, g_{k-1})$ with all $g_i$ distinct since each coset gH is completely determined by its action on $T_k$.

(5) Theorem. $H(\Delta H) \subseteq \Delta H$.

(6) Corollary. The cayley coset graph $\Gamma = (G,\Delta,H)$ can be formed with the number of nodes $(d+1)!/(d+1-k)!$ and degree d.

(7) Definition. Given $(x_0, x_1, \ldots, x_{k-1})$, let $c(x_0, x_1, \ldots, x_{k-1}) = |\{x \in T_k | x \neq x_i \text{ and } x > x_{k-1}\}|$, where $T_k = \{0, 1, 2, \ldots, k-1\}, 0 \leq i \leq k-1$.

(8) Lemma. If there is a path of length j, $j = 0,1, \ldots k-1$ from $R = (0,1,2,\ldots,k-1)$ to P then P has the form (*) $(x_0, x_1, \ldots, x_{k-1})$ with $x_i \in T_k$ for $i \geq j$, $x_j < x_{j+1} < \cdots < x_{k-1}$ and $|\{x_i | i < j \text{ and } x_i \in T_k\}| \leq c(x_0, x_1 \ldots, x_{k-1})$.

(9) Theorem. There is then, a unique shortest path of length at most k from $R(0,1,2,\ldots, k-1)$ to any vertex.

(10) Theroem. If $G_1$ and $G_2$ are k-transitive groups on $d+1$ letters, then the graphs $\Gamma(G_1,\Delta_1, H_1)$ and $\Gamma(G_2, \Delta_2, H_2)$ described in Corollary (6) are isomorphic graphs with $(d+1)!/(d+1-k)!$ vertices.

(11) Theorem. For each $k \leq d$, there exist vertex symmetric graphs $\Gamma_d(k)$ with degree d, diameter k, and $(d+1)!/(d+1-k)!$ nodes.

As provided by Theorem (9), the node interconnections herein described provide a unique shortest path between any two nodes. Since $\Gamma_d(k)$ is vertex transitive, all nodes look alike and it is sufficient to discuss only one source node, e.g. $R = (0,1,2, \ldots, k-1)$, with a destination node $D = (x_0, x_1, \ldots x_{k-1})$. The shortest routing path occurs in two phases.

Phase I

Computation of the smallest j such that STAR [defined as (*) in Lemma (8)] holds.

If $x_{k-1} \in T_k$, set $j = k$ and terminate. Otherwise, compute CEE [defined as $c(x_0, x_1, \ldots x_{k-1})$ in Definition (7)], which is independent of j. Next, count $|\{x_i | x_i \in T_k\}|$. If this is larger than CEE, set $j = k$ and terminate. Otherwise set j smallest so that $x_j < x_{j+1} < \cdots < x_{k-1}$.

Phase II. Routing

Routing is completely determined by the destination address components $(x_0, x_1, \ldots x_{j-1})$. Indeed, after 1 steps, all that is needed is the current address $(y_0, y_1, \ldots y_{k-1})$ and the destination address truncated to $(x_0, x_1, \ldots x_{j-l-1})$. The message itself and further truncated destination address $(x_0, x_1, \ldots, x_{j-l-2})$ is sent to the node whose address is formed by appending $x_{j-l-1}$ to the beginning of $(y_0, y_1, \ldots, y_{k-1})$ and then (A) either removing $x_{j-l-1}$ from the list $(y_0, y_1, \ldots, y_{k-1})$ if it occurs, or (B) removing $y_{k-1}$ if $x_{j-l-1}$ does not occur in the list. When (A) happens, the output direction is $\delta_\alpha$, where $\alpha$ marks the position of $x_{j-l-1}$ in the current address, and when (B) happens, then the output direction is determined by the choice of coset representative used to label the node. The convention herein used is that the $\delta_\alpha$ for $\alpha \geq k$ point toward addresses whose leading digits increase with $\alpha$.

Routing from a general source node $S = (s_0, \ldots, s_{k-1})$ to a destination $D = (x_0, \ldots, x_{k-1})$ is no more complex than routing from R. It is only necessary to redefine $T_k$ to be the totally ordered set $\{s_0, s_1, \ldots, s_{k-1}\}$ and to define CEE relative to $T_k$, where $CEE = |\{x \in T_k| x \neq x_i \text{ and } x \text{ follows } x_{k-1} \text{ in } T_k\}|$. The routing proceeds as outlined above.

It should be noted that there is always a route from R to D which takes exactly k steps (the "constant distance" route) unless the initial letter of the source address matches the last letter of the destination address. This route is formed by setting j = k in Phase I regardless of its actual value and following the routing procedure in Phase II.

It can be shown that in any of the graphs $\Gamma_d(k)$ with $d \geq k \geq 4$, it is possible to find a route between any two nodes which has length at most k + 1 and does not use the direction $\delta_1$. By omitting $\delta_1$ from $\Gamma_d(k)$, the graphs $\Gamma_d(k, -1)$ are formed with degree d − 1, diameter k + 1, and $(d+1)!/(d+1-k)!$ nodes, and this route is the constant distance route, except in three special cases. These cases are when (I) $x_{k-1} = 0$, (II) $x_{k-1} = 1$, (III) $x_{k-1} \neq 1$, $x_{k-2} = 0$.

In these cases, there can be found a route which avoids $\delta_1$, as follows.

Case I

If $x_{k-2} \neq 1$, the route is $(0, 1, \ldots k-1) \rightarrow (x_{k-2}, 0, 1, *, \ldots, *) \rightarrow \ldots \rightarrow (x_1, x_2, \ldots, x_{k-2}, 0^*) \rightarrow (x_0, x_1, \ldots x_{k-2}, 0)$. If $x_{k-2} = 1$, the route is $(0, 1, \ldots, k-1) \rightarrow (x_0, 0, 1, *, \ldots, *) \rightarrow (1, x_0, 0, *, \ldots, *) \rightarrow \ldots \rightarrow (*, \ldots, *, x_{k-3}, 1, x_0, 0) \rightarrow (x_0, x_1, \ldots, x_{k-3}, 1, 0)$.

Case II

If $x_0 \neq 0$, the route is $(0, 1, \ldots, k-1) \rightarrow (x_0, 0, 1, *, \ldots, *) \rightarrow (1, x_0, 0, *, \ldots, *) \rightarrow \ldots \rightarrow (\ldots, x_{k-3}, x_{k-2}, 1, x_0) \rightarrow (x_0, x_1, \ldots, x_{k-2}, 1)$. If $x_0 = 0$, the route is $(0, 1, 2, \ldots, k-1) \rightarrow (x_{k-2}, 0, 1, *, \ldots, *) \rightarrow (x_{k-3}, x_{k-2}, 0, 1, *, \ldots, *) \rightarrow \ldots \rightarrow (x_1, x_2, \ldots, x_{k-2}, 0, 1) \rightarrow (0, x_1, x_2, \ldots, x_{k-2})$.

Case III

Since $x_{k-1} \neq 1$, the route is $(0, 1, 2, \ldots, k-1) \rightarrow (x_{k-1}, 0, 1, *, \ldots, *) \rightarrow (x_0, x_{k-1}, 0, *, \ldots, *) \rightarrow (0, x_0, x_{k-1}, *, \ldots, *) \rightarrow (x_{k-3}, 0, x_0, x_{k-1}, *, \ldots, *) \rightarrow \ldots \rightarrow (x_1, x_2, \ldots x_{k-3}, 0, x_0, x_{k-1}) \rightarrow (x_0, x_1, x_2, \ldots, x_{k-3}, 0, x_{k-1})$.

In these cases, the direction $\delta_1$ is avoided, while increasing the diameter at most one step. Thus, $\Gamma_d(k, -1)$ denotes the graph $\Gamma_d(k)$ with the edges in direction $\delta_1$ removed, and $\Gamma_d(k, -1)$ is vertex symmetric and its diameter is k + 1.

Figure 1:
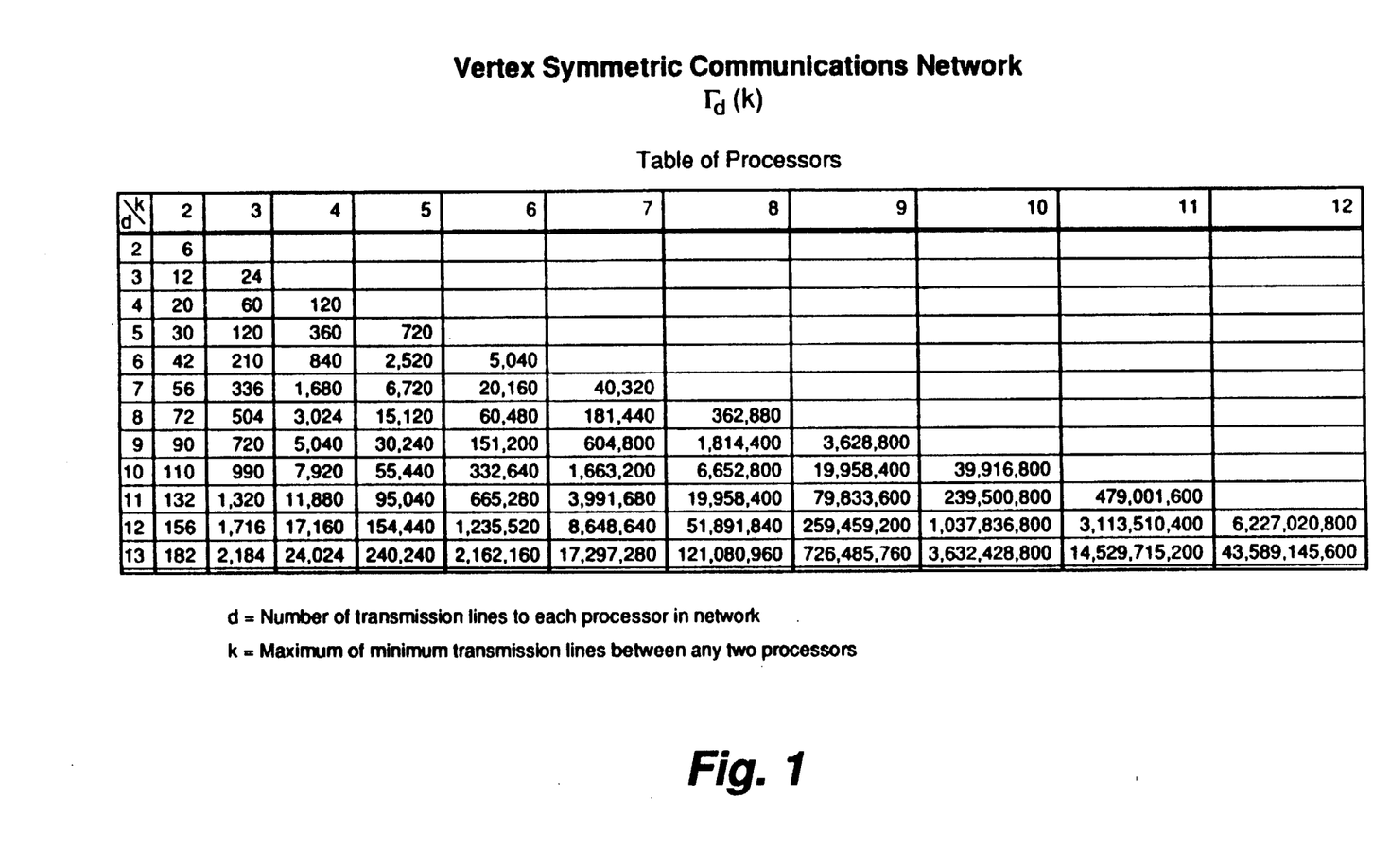
FIG. 1 is a table showing the number of processors available in networks formed from graphs $\Gamma_d(k)$ according to the present invention.
Figure 2:
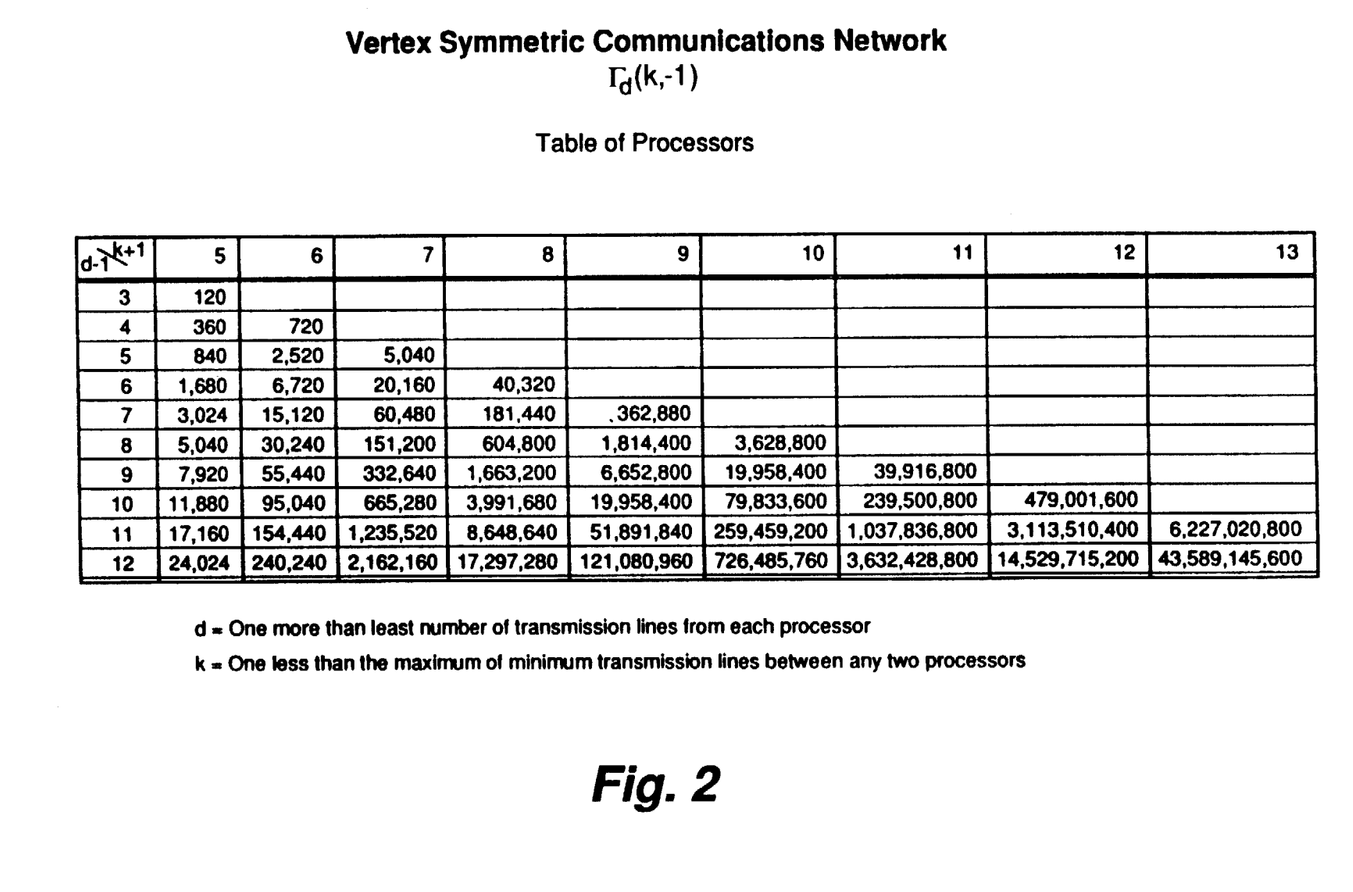
FIG. 2 is a table showing the number of processors available in networks formed from graphs $\Gamma_d(k,-1)$ according to the present invention.

The number of processors, or nodes, in each of the vertex symmetric directed graphs, $\Gamma_d(k)$, is shown in FIG. 1 for degree d, and diameter, $k \leq d$. For the set of graphs, $\Gamma_d(k, -1)$, which have degree d − 1 and diameter k + 1, the number of connected processors is $(d+1)!/(d+1-k)!$, as shown in FIG. 2 for $d \geq k \geq 4$. Then, if the networks defined by Theorem (11) are combined with $\Gamma_d(k, -1)$, for each $k \leq d + 1$, there exist vertex symmetric graphs $\Gamma$ with degree d, diameter k, and $\max((d+1)!/(d+1-k)!, (d+2)!/(d-k+3)!)$ nodes. This can be seen by comparing FIGS. 1 and 2.

It is believed that the networks constructed according to the above theory are maximally fault tolerant. Further, the networks are expandable so that d + 1 copies of $\Gamma_d(k)$ can be connected to form $\Gamma_{d+1}(k+1)$. Additionally, the number of virtual channels per real channel needed to break deadlocks is certainly no larger than the diameter.

Figure 3:
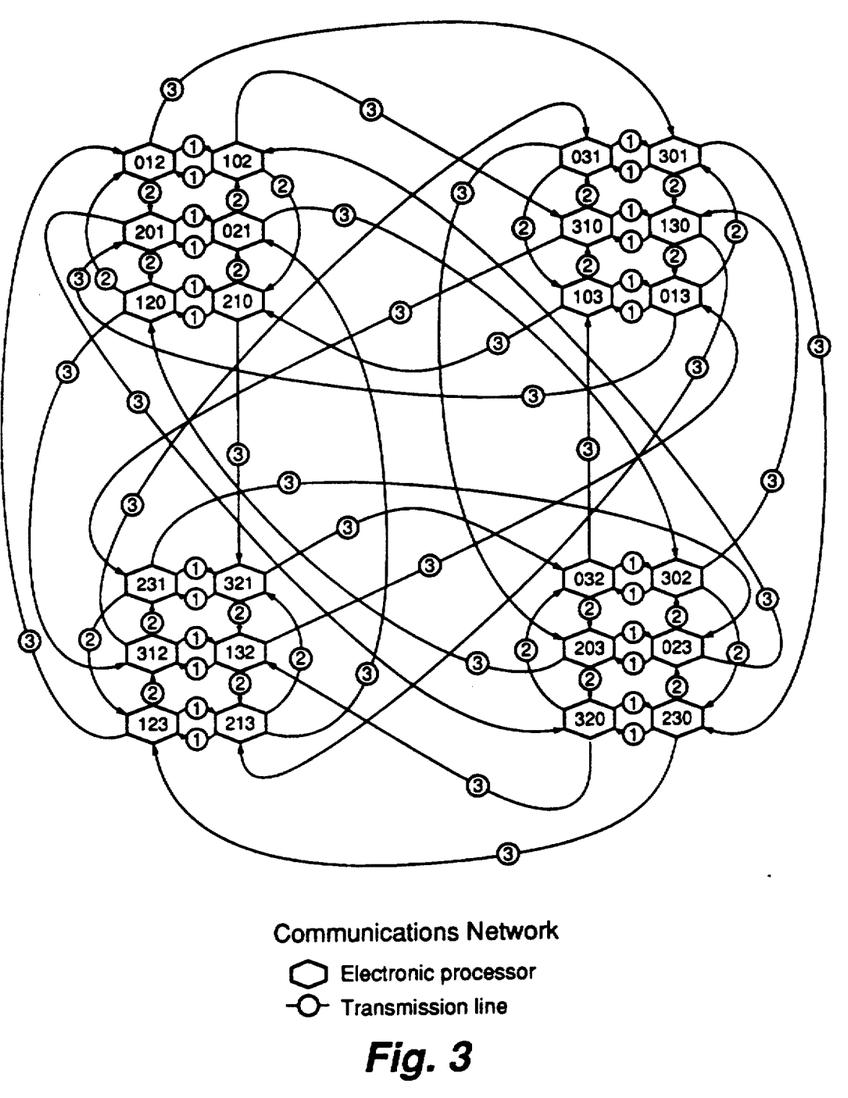
FIG. 3 is a vertex symmetric network defined by graph $\Gamma_3(3)$ with illustrative node addresses and channel connections.

To illustrate a network constructed according to the above principles, FIG. 3 depicts a 24 node network ($\Gamma_3(3)$) constructed from four 6 node networks ($\Gamma_2(2)$). Each node has three wire pairs connecting the node with the network and, at most, three paths must be traversed to connect any node to any other node in the network. An illustrative routing from source node (0 1 2) to destination node (2 0 3) is as follows.

Phase I. The last letter (3) of the destination address is not in the source address so there is no short route.

Phase II. The first intermediate node address is formed by appending the last letter (3) of the destination address to the beginning of the source address to form (3 0 1 2) and then truncating to the address length (3 0 1). The header number (2 0) is transmitted to node (3 0 1). The last number (0) of the header is then appended to the front of the present address to form the next intermediate address (0 3 1), where the appended letter is present and is therefore dropped from the present address. The last letter (0) of the header is dropped and the header (2) is transmitted to address (0 3 1). Again the last letter (2) of the header is appended to the front of the current address to form the destination address (2 0 3), where the header letter is not present in the current address and the last letter is dropped. Thus, the following route is indicated: (0 1 2) → (3 0 1) → (0 3 1) → (2 0 3).

To construct a network according to the present invention, the number of nodes, or processors, must be determined and each node is identified by a sequence of letters, usually integers, to form an address for the node. Each address is one of the permutations of a predetermined set of letters (the "set" $T_k$), chosen some fixed number at a time corresponding to the address length. For example, FIG. 3 is constructed from the set {0 1 2 3} taken three at a time to form the addresses depicted e.g. 012,102,320, etc., where no two address letters are identical. It should be noted that each node also has an extended address from the node address, where the set letters which are not in the node address are added on in some standard manner. The standard manner used herein is the same sequence as in the set. Thus, the extended address of node 012 is 0123; for node 301, it is 3012.

In the following discussion a convention is also needed to identify the position of a letter in an address to determine the routing directions, or "channels", as noted in the discussion above on phase II routing. As used herein, the zero position is the first letter in the address. Thus, in the string of letters 23140, the zero element is 2, the first element is 3, the second element is 1 etc.

Each node must now be connected to other nodes. The number of channels for each node is one less than the number of letters in the set. The address of the node connected to each channel is determined as follows: for channel K, $K \geq 1$, remove the letter in the Kth position in the extended address of the source node and place the letter at the front of the extended address of that node, starting the count at the zero position. Connect channel K to the node whose address is the resulting first set of letters truncated to the number of letters in the source node.

Referring again to FIG. 3, it is seen, for example, that the following nodes are connected to source node 213:

| Extended address | 2 1 3 0 |
| Position | 0 1 2 3 |
| Channel | Node connection |
| 1 | 1 2 3 |
| 2 | 3 2 1 |
| 3 | 0 2 1 |

By way of further example, given a source node address 1 4 5 2 3 and a letter set {0 1 2 3 4 5 6 7}, the extended source node address is 1 4 5 2 3 0 6 7. The node connected through channel 1 is determined by taking the letter in the first position, 4, and placing it in front of the source node extended address to form 4 1 5 2 3 0 6 7, with the node address formed from the first five letters, or 4 1 5 2 3. Likewise channel 6 is connected to node 6 1 4 5 2.

Tracing a path from a source node to a destination node requires only the source node address and the destination node address. Starting with the right hand letter of the destination address, that letter is found in the extended source address and placed at the front of the source address to find a first intermediate node. The position of that letter in the source address determines the appropriate channel for transmission. The next right hand letter of the destination is then removed from the extended address of the first intermediate node and placed at the front to form a second intermediate node address. Again, the channel corresponds to the position of the selected letter in the first intermediate node address.

Example:

| Source | 1 3 4 2 5 |
| Destination | 2 6 7 3 4 |
| Extended Address | 1 3 4 2 5 0 6 7 |
| Channel | To |
| 2 | 4 1 3 2 5 |
| 2 | 3 4 1 2 5 |
| 7 | 7 3 4 1 2 |
| 7 | 6 7 3 4 1 |
| 6 | 2 6 7 3 4 |

In this example, the full network is not known; only that the letter set has at least 8 elements {0 1 ... 7}. Communication between two nodes takes place in the sub-network which is "spanned" by the letters which make up the node addresses. Thus, "0" never appears in this routing. However, the letter "0" must appear in the extended address to enable channel numbers to be computed.

It will be appreciated that the routing between processors in a network formed according to the present invention can be done in a process which is the same at each processor, or node. In a preferred embodiment, this processing is done according to the flow charts shown in FIGS. 4A, 4B, 4C, 4D, 4E, and 4F. The flow charts can be implemented in relatively simple computer software by a person of ordinary programming skill on a selected computer system. The only information required is the current node address and the final destination address truncated as herein above described.

Figure 4A:
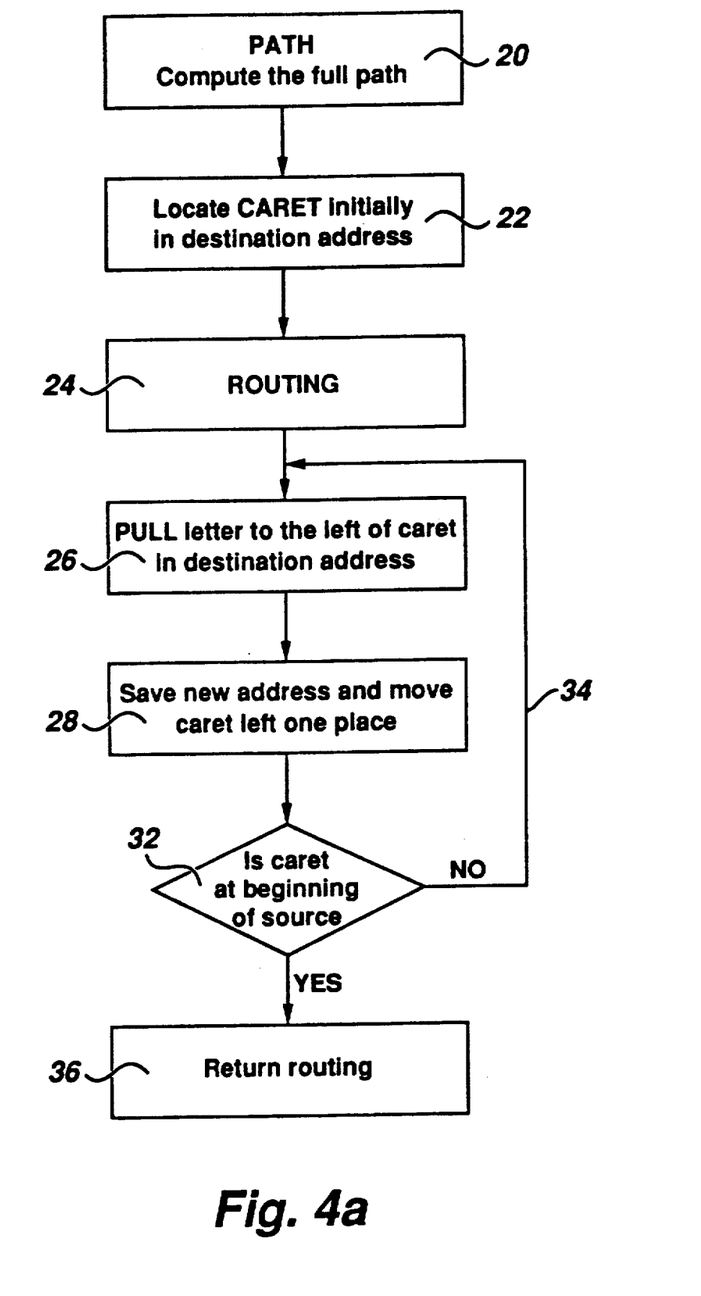
FIG. 4A is a flow chart for computing a full path routing.
Figure 4B:
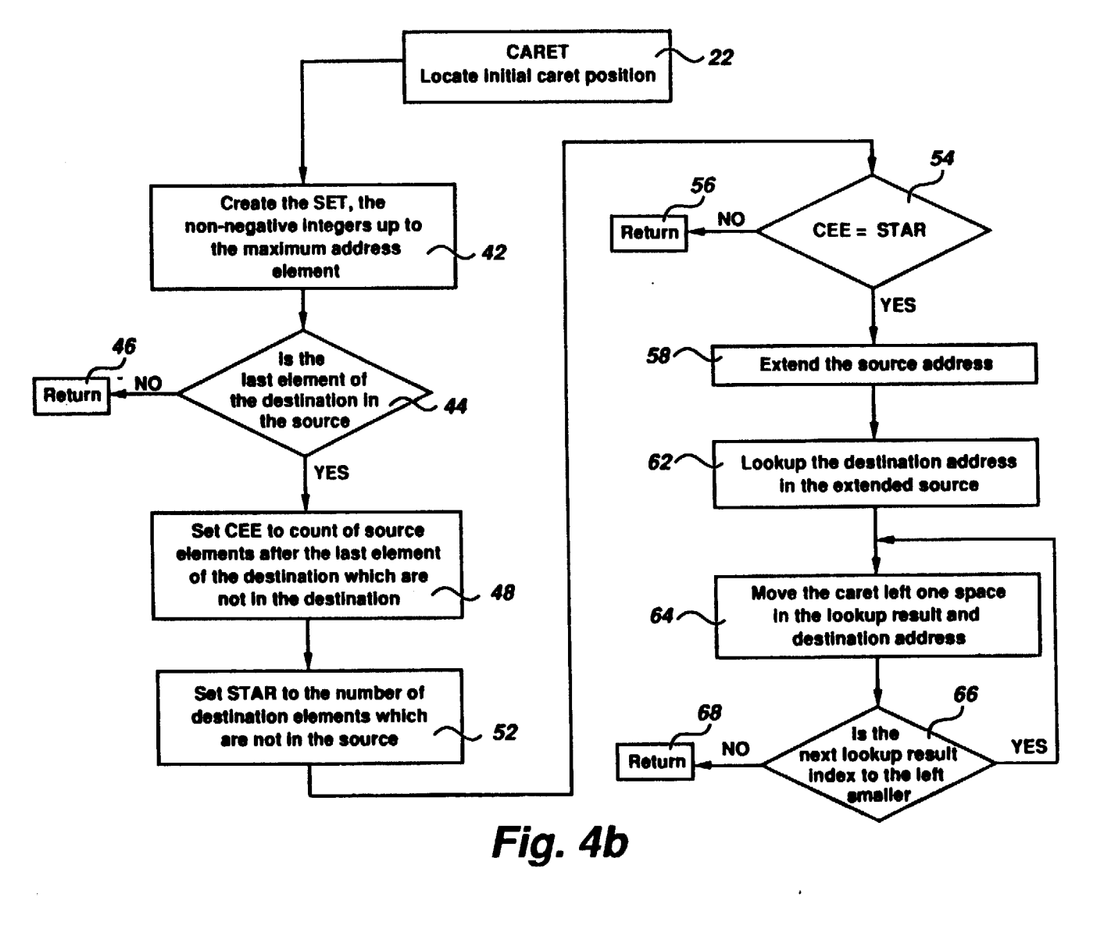
FIG. 4B is a flow chart for locating an initial caret position.

Referring now to FIGS. 4A and 4B, there are shown flow charts for routing a message along a full routing path. PATH 20 is initialized for computing the full message route. Then the CARET 22 is located for determining the first header from which the initial channel and connecting node is determined for routing from the source node. Once CARET 22 is located, ROUTING 24 is performed. PULL 26 (FIG. 4C) removes the letter immediately to the left of the caret and places that letter at the front of the current node address to generate the next node address. The new node address is saved and the caret is moved one place to the left 28 to form the header used with the new node address to determine a subsequent node address. It is then determined whether the caret has moved through the original header. If not, the program is returned 34 to ROUTING 24 to determine subsequent node addresses. If yes, PATH 20 has been completed.

The routine for determining CARET 22, the initial caret position, is shown in FIG. 4B. When CARET 22 is called, a SET 42 of letters is first created, formed from the set of nonnegative integers up to the maximum address element. The destination address is compared 44 with the source address. If the last element of the destination address is not in the source address, the caret is placed to the right of the destination address and the program returns 46 to ROUTING 24. If the last element is present, CEE is set 48 to the count of the number of source address elements after the last element of the destination address which are not also in the destination address. CEE can range from zero to one less than the number of letters in the address.

To determine whether a short path is available, STAR is set 52 to the count of elements in the destination address which are not also in the source address. CEE and STAR are compared 54. If CEE and STAR are not equal, no short path exists and the program sets the caret to the right of the destination address elements and the program returns 56 to ROUTING 24. If CEE and STAR are equal, the initial caret location in the destination address is determined in steps 58–66.

The source address is first placed in extended format 58 and the destination address is looked up 62 in the extended source address. To "look up" an address in another address is to determine the location of the second address letters in the first extended address to derive a number comprising the position sequence. A caret is moved to the left through the position sequence and the destination address 64. Each position sequence number is compared 66 with the proceeding number and the caret is moved 64 to the left until a larger number is found. The program is returned to CARET 22 with the caret located in the destination address at the same location determined for the position sequence caret in process steps 64 and 66. ROUTING 24 is then initiated with the header determined by the caret in the moved position.

For example, for source address 3 2 4 5 1, destination address 0 5 1 3 2, and set {012345678}, the extended source address is 3 2 4 5 1 0 6 7 8. Look up 62 determines the position sequence for the destination address to be 5 3 4 0 1. As the caret 64 moves left through the position sequence, comparison 66 determines that the first two index numbers are in decreasing order. The caret is also moved two places left in the destination address to form header 0 5 1 and ROUTING 24 is started with this header to form the path:

|    | NODE  | HEADER | CHANNEL |
|----|-------|--------|---------|
|    | 32451 | 051    | 4       |
| To | 13245 | 05     | 4       |
| To | 51324 | 0      | 5       |
| To | 05132 |        |         |

Figure 4C:
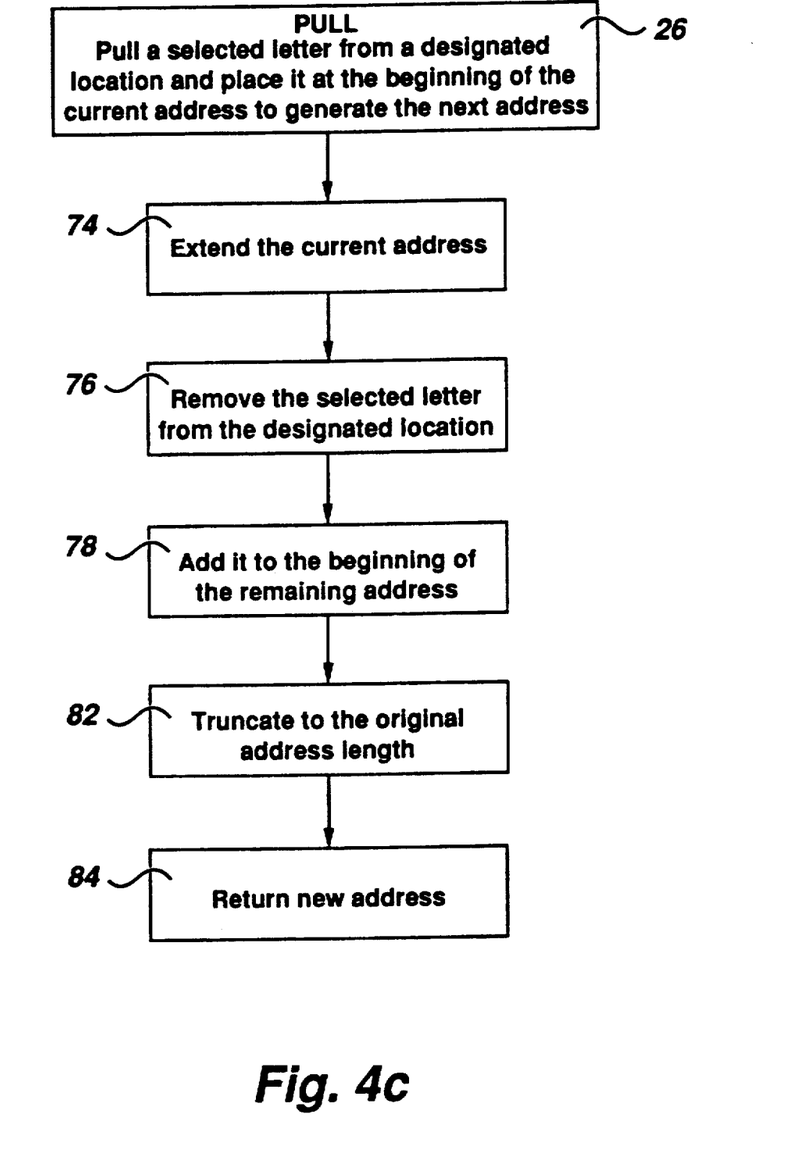
FIG. 4C is a flow chart for PULL to form a new address from a current address.

In ROUTING 24, PULL 26 is used to form the sequence of addresses (see above example). The current node address is first extended 74. The letter immediately to the right of the caret, i.e., the last letter of the current header, is removed 76 in the current extended node address and added 78 to the beginning of the remaining address. The amended extended address is truncated 82 to the original address length to form a new address which is returned to the new address 28 (FIG. 1).

In another embodiment, the individual nodes can be provided with simple look up tables to determine the message transmission channel from the last element of the current header. If the position sequence of the letter set in the extended node address is stored, then the letter located at the position determined by the last letter of the header is the channel for transmission of the message and the new header. The NODE processing 90 shown in FIG. 4D first removes 92 the last element of the received header. The removed element indexes 94 into the stored position sequence which is stored at the node to find the channel number at the location identified by the removed element. The node then transmits 96 to the node connected to the indexed channel.

Figure 4D:
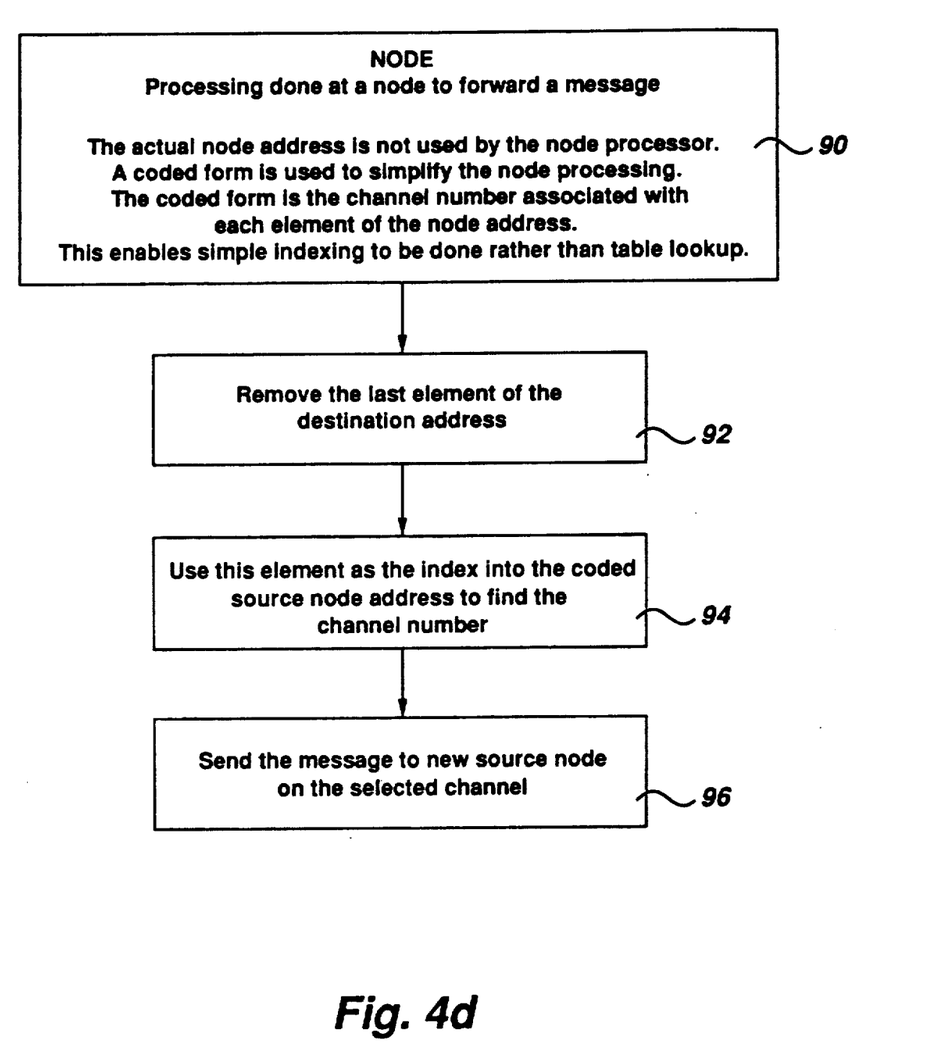
FIG. 4D is a flow diagram showing processing done at a node to forward a message.

For example, select set {01234567} and a node address 1 3 4 2 5. The extended address is 1 3 4 2 5 0 6 7 and the set position sequence is then 5 0 3 1 2 4 6 7. If a message header has the trailing element 4, the location sequence is indexed to the fourth position to find the transmission channel, channel 2.

As shown by comparing FIG. 1 and FIG. 2, the $\Gamma_d(k,-1)$ network includes a band around the diagonal with a larger number of processors at the expense of one additional routing step. Routing in this band is complicated since the networks in the band have two-way connections between pairs of nodes. By removing one of the two-way connections, i.e, removing connections between channels having direction $\delta_1$ in the network graph $\Gamma_d(k)$, the degree of the node is reduced by one at the expense of increasing the diameter by one to form the network graph $\Gamma_d(k,-1)$. The normal routing process can not proceed, however, if the removed connections are used in the routing. Since the $\Gamma_d(k,-1)$ network connections become the same as the $\Gamma_d(k)$ connections after a few initial steps, the routing process must provide for initial movements which does not use the channels which are deleted. It should be noted that although the channels are actually removed from the network, no renumbering occurs in order to preserve the numbering schemes and the algorithms, i.e., the channel numbers exist but are never called.

Figure 4E:
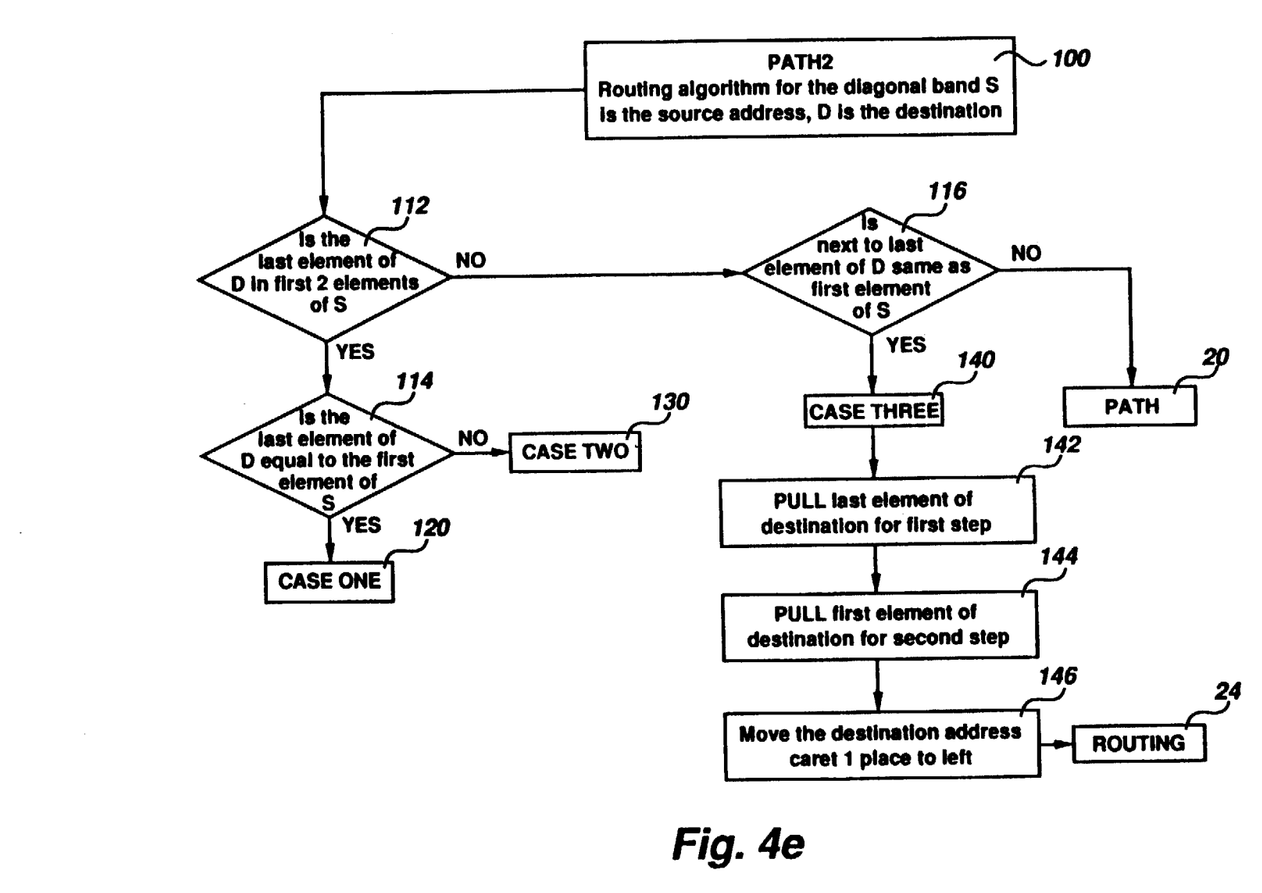
FIG. 4E is a flow diagram for special case routing from the diagonal band.
Figure 4F:
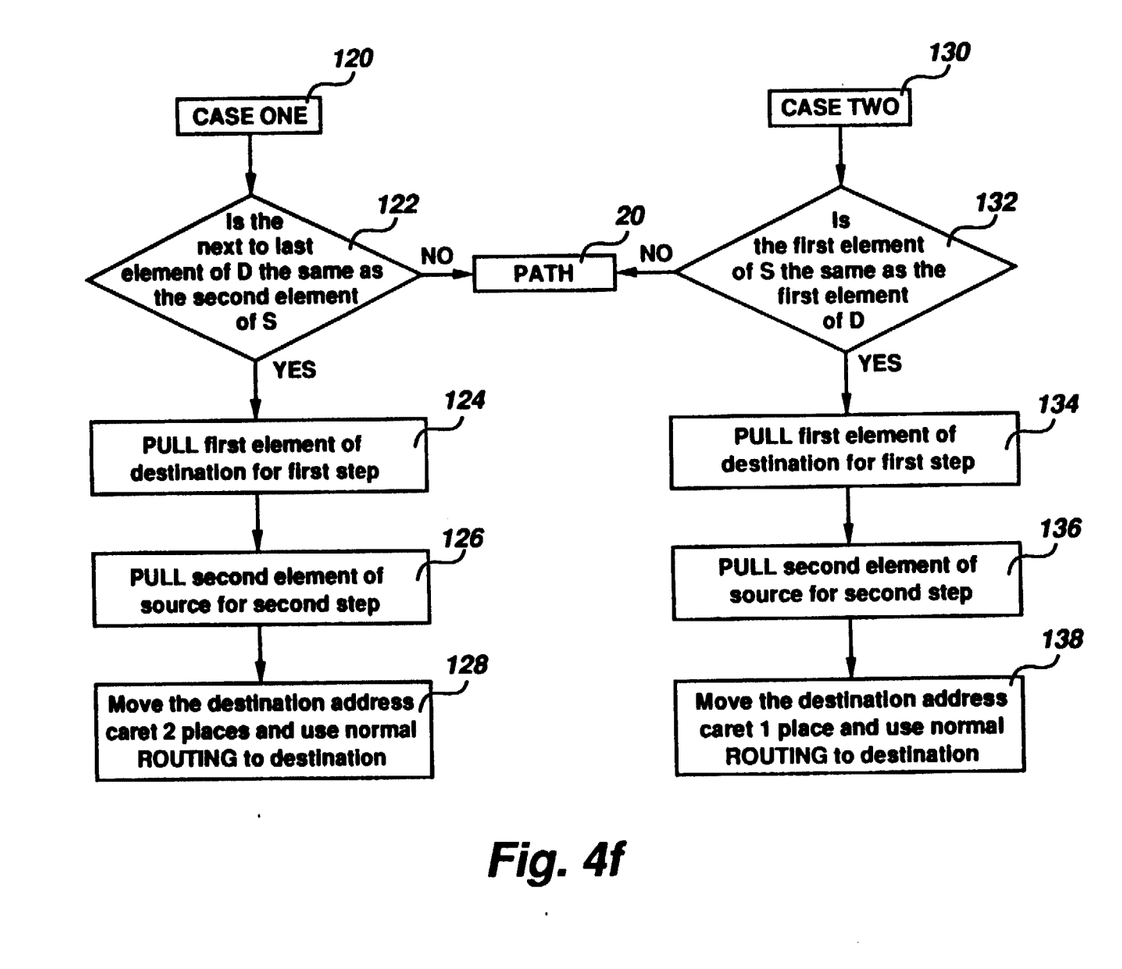
FIG. 4F is a flow diagram for special case processing, CASE 1 and CASE 2.

There are three special cases with initial processing determinations shown in FIGS. 4E and 4F which are determined from the relationship of the destination processor address to the source processor address. A special case routing determination is first made for diagonal band routing PATH2 100 by comparing the last one or two elements of the destination node address with the first one or two elements of the source node address. It is first determined if the last element of the destination can also be found in the first two elements of the source. If so, the last element of the destination is compared 114 to the first element of the source. If the elements are the same, CASE ONE 120 is executed; if unequal, CASE TWO 130 is executed (FIG. 4F).

If the last two elements of the destination are not the first two elements of the source, the next to last element of the destination is compared 116 to the first element in the source. If the elements are not equal, the processing returns to PATH 20 (FIG. 4A). If the elements are equal, CASE THREE 140 is executed. As hereinbelow used, each of the PULL steps use the PULL 26 routine set out in FIG. 4C. The last element of the destination is first PULLED 142 to the source and the first element of the destination is then PULLED 144 to the source to form first and second intermediate addresses, respectively. The second intermediate address forms the initiation address for the common routing algorithm ROUTING 24 (FIG. 1). The caret is moved 146 one place to the left in the destination address to form a header from the above initiation address and the program returns to ROUTING 24 (FIG. 1).

Referring now to FIG. 4F, if CASE ONE 120 is indicated the next to last element of the destination is then compared 122 to the second element of the source. If the elements are not equal, the process returns to PATH 20. Otherwise, the first element of the destination is PULLED 124 to the source and the second element of the original source is PULLED 126 to the address formed at step 124 to form first and second intermediate addresses, respectively. Again, the second intermediate address is the initiation address. The caret is moved 128 two places to the left in the destination address to form a header from the above initiation address and the process is returned to ROUTING 24.

If CASE TWO 130 is indicated, the first element of the source is compared 132 with the first element of the destination. If the two elements are not equal, the process is returned to PATH 20. Otherwise, the first element of the destination is PULLED 134 to the original source and the second element of the original source is PULLED 136 to the address formed by step 134 to form first and second intermediate addresses, respectively. The caret is moved one place to the left in the destination address to form a header from the above second, or initiation, address and the process is returned to ROUTING 24.

The following examples illustrate application of the three special cases:

|      | CASE ONE |   |
|------|----------|---|
| Source | 5 1 3 0 4 2 | |
| Destination | 4 2 3 0 1 5 | |
| Step | Action | |
| 112 | Last element of D (5) is in S first two (5 1). | |
| 114 | Last element of D (5) is S first (5). CASE ONE. | |
| 122 | Next to last element of D (1) is S second (1). | |
| 124 | PULL D first to S to form 4 5 1 3 0 2. | |
| 126 | PULL S second (1) to form 1 4 5 3 0 2. | |
| 128 | Move caret 2 places in D to form header 4 2 3 0. | |
| 24 | ROUTING | |
|     | From 5 1 3 0 4 2 | |
|     | To   4 5 1 3 0 2 | (first intermediate address) |
|     | To   1 4 5 3 0 2 | (initiation address) |
|     | To   0 1 4 5 3 2 | (ROUTING 24 using header 4 2 3 0) |
|     | To   3 0 1 4 5 2 | |
|     | To   2 3 0 1 4 5 | |
|     | To   4 2 3 0 1 5 | |
|      | CASE TWO |   |
| Source | 1 5 3 0 4 2 | |

-continued

```
        Destination   4 2 3 0 1 5
Step    Action
112     Last element in D (5) is in S first two (5 1).
114     Last element in D (5) is not S first (1). CASE TWO.
132     First element of S (1) is not first element of D (4).
134     PULL D first to S to form 4 1 5 3 0 2.
136     PULL S second to 134 address to form 5 4 1 3 0 2.
138     Move caret one place in D to form header 4 2 3 0 1.
24      Routing from address 5 4 1 3 0 2. header 4 2 3 0 1.
Thus, the routing is:
From    1 5 3 0 4 2
To      4 1 5 3 0 2    (first intermediate address)
To      5 4 1 3 0 2    (initiation address)
To      1 5 4 3 0 2    (ROUTING 24 using header 4 2 3 0 1)
To      0 1 5 4 3 2
To      3 0 1 5 4 2
To      2 3 0 1 5 4
To      4 2 3 0 1 5    Destination
                       CASE THREE
        Source        1 3 5 0 4 2
        Destination   4 2 3 0 1 5
Step    Action
112     Last element D (5) not first two elements of S (1 3).
116     Next to last D (1) same as S first (1).
140     CASE THREE
142     PULL D last to S to form 5 1 3 0 4 2.
144     PULL D first to 142 address to form 4 5 1 3 0 2.
146     Move caret in D to form header 4 2 3 0 1.
24      ROUTING from 4 5 1 3 0 2 with header 4 2 3 0 1.
Thus, the path is
From    1 3 5 0 4 2
To      5 1 3 0 4 2    (first intermediate address)
To      4 5 1 3 0 2    (initiation address)
To      1 4 5 3 0 2    (ROUTING 24 using header 4 2 3 0 1)
To      0 1 4 5 3 2
To      3 0 1 4 5 2
To      2 3 0 1 4 5
To      4 2 3 0 1 5    Destination.
```

In accordance with the present invention as described above, a new interconnected network of processors has been formed in vertex symmetric directed graphs, $\Gamma_d(k)$, which have degree d, diameter $k \leq d$, and a number of nodes, or processors, $(d+1)!/(d+1-k)!$. Further, a process for routing messages through the network defined by the graphs has been provided which is simple and which yields the unique shortest paths between any two nodes. As special cases, interconnected networks formed in vertex symmetric directed graphs, $\Gamma_d(k,-1)$ for $d \geq k \geq 4$, which have degree $d-1$, diameter $k+1$, and $(d+1)!/(d+1-k)!$ nodes, are defined by omitting one edge from each node in $\Gamma_d(k)$.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for electronically connecting a source processor computer and a destination processor computer located in a network of a plurality of processor computers interconnected by a plurality of transmission lines for transmitting a message, where each of said plurality of transmission lines has a path between two nodes in a vertex symmetric network consisting of networks defined by graphs $C_d(k)$ with degree d, diameter k, and $(d+1)!/(d-k+1)!$ of said processor computers for each $d \geq k$ and $C_d(k,-1)$ with degree $d-1$, diameter $k+1$, and $(d+1)!/(d-k+1)!$ of said processor computers for each $d \geq k \geq 4$ and one of said processor computers is electronically connected to ones of said transmission lines arriving at each of said nodes, comprising the computer implemented steps of:

electronically identifying each processor computer with a unique process address having a permutation of indices chosen a selected number at a time from a predetermined sequence of indices $T_k = \{(a_0, a_1, \ldots, a_n\}$, where said source processor computer address is $S = (s_0, s_1, \ldots, s_{k-1})$ and said destination processor computer address is $D = (x_0, x_1, \ldots, x_{k-1})$, $k-1 \leq n$ and $\{s, x \in T_k\}$;

electronically computing the sequence of addresses of intermediate processor computers defining said routing, wherein said route is directed from a current processor computer process address $S_M = (s_0', s_1', \ldots, s_{k-1}')$, where $S_M$ is the Mth intermediate processor computer in the routing path from said source processor S, to next processor computer software address $S_{M+1}$ determined from truncated $D_M = (X_0, X_1, \ldots, x_{k-M-1})$ by a first software routine placing $x_{k-M-1}$ at the front of $S_M$, where $s_i = x_{k-M-1}$ is removed from $S_M$ if $s_i$ is in $S_M$ or $s_{k-1}$ is dropped if $s_i$ is not in $S_M$, and truncating $D_M$ to $D_{M+1} = (x_0, x_1, \ldots, x_{k-M-2})$ for use with $S_{M+1}$ to electronically compute a next processor computer address; and connecting said $S_M$ processor computer to said $S_{M+1}$ processor computer for transmitting said message and $D_{M+1}$.

2. A method for electronically connecting said processors according to claim 1, including the step of determining a shortest routing path through said network uniquely from said source address S and said destination address D.

3. A method of electronically connecting said processors according to claim 2, further including the steps of:

initiating a second software routine for determining from the relationship of said destination processor computer address D to said source processor computer address S an intermediate initiation processor computer address for initiating said sequence of addresses of said intermediate processor computers and truncating said destination processor address D according to said relationship;

transmitting said message and said truncated destination address to said determined intermediate processor computer address; and thereafter initiating said steps of electronically determining said sequence of addresses of intermediate processor computers defining said routing.

4. A method for electronically routing messages according to claim 3, wherein said second software routine for determining the relationship of said destination processor address to said source processor address includes the following source computer processing steps:

comparing the last element of the destination address to the first two elements of said source address;

if said last element is found in said first two elements, then comparing said last element with said first element of said source computer address;

if said last element is identical with said first element, identifying a first intermediate initiation processor computer as a first special case, else identifying a second intermediate initiation processor computer as a second special case;

if said last element is not found in said first two elements, then comparing the next to last element of said destination address with said first element of said source computer address;

if said last element is the same as said first element, identifying a third intermediate initiation processor computer address as a third special case, else setting said initiation processor computer address as said source computer address for route determination.

5. A computer implemented method for electronically connecting a message path between a source electronic processor computer and a destination electronic processor computer located in a network of a plurality of processor computers each having a message routing computer and a connected set of transmission lines, where each of said transmission lines is a path between two processor computers, each located at a node in a vertex symmetric network consisting of networks defined by graphs $C_d(k)$ with degree d, diameter k, and $(d+1)!/(d-k+1)!$ of said plurality of electronic processors for each $d \geq k$ and $C_d(k,-1)$ with degree $d-1$, diameter $k+1$, and $(d+1)!/(d-k+1)!$ of said plurality of electronic processor computers for each $d \geq k \geq 4$ where each processor computer has a process address having a permutation of indices chosen a selected number at a time by a first processor routine from a predetermined sequence of indices $T_k = \{a_0, a_1, \ldots, a_n\}$, where said source processor computer address is $S = (s_0, s_1, \ldots, s_{k-1})$ and said destination processor computer address is $D = (x_0, x_1, \ldots, x_{k-1})$, $k-1 \leq n$ and $\{s, x \in T_k\}$ and each transmission line in said set of transmission lines has an identifying index selected from a different position in $T_k$, comprising the computer implemented steps of:

electronically storing in said message routing computer for each said processor computer a routing table with a sequence of numbers corresponding to the position of each element of said processor computer address in said predetermined sequence of indices;

performing a second process routine in said message routing computer for selecting a message transmission line at a processor computer $S_M$ after M routing steps from a truncated destination computer address $D = (x_0, x_1, \ldots, x_{k-M-1})$ by locating the element in position $x_{k-M-1}$ in said table to identify said corresponding transmission line index for message transmission to a subsequent processor computer; and connecting said processor computer $S_M$ through said identified transmission line with processor computer $S_{M+1}$.

6. A date transmission network, comprising:

a plurality of transmission line sets, each said set consisting of a number of transmission lines one less than the number of indices in a preselected sequence of indices where each transmission line in said set has an identifying index from a different position in said sequence of indices except the zero position; and a plurality of processor computers interconnected by said transmission line sets, where each said processor computer has a first electronic address formed by a unique one of the permutations of indices chosen a selected number at a time from said sequence of indices and a first extended process address formed by appending to said first address the remaining indices from said sequence of indices and is electrically connected by said transmission lines in a one of said sets to second processor computers, each one of said connected second computers having a unique second computer address formed from said first extended address and said identifying index of said connecting transmission line by moving to the zero position of said first extended address the index found at the position within said first extended address corresponding with said connecting transmission line identifying index and then truncating the resulting sequence if indices to the number of indices in said first process address;

said plurality of transmission line sets defining a vertex symmetric network with each of said processor computers forming a node of said vertex symmetric network.

7. A data communications network according to claim 6, wherein said vertex symmetric network is selected from graphs $C_d(k)$ with degree d, diameter k, and $(d+1)!/(d-k+1)!$ of said plurality of processor computers for each $d \geq k$ and $C_d(k,-1)$ with degree $d-1$, diameter $k+1$, and $(d+1)!/(d-k+1)!$ of said plurality of processor computers for each $d \geq k \geq 4$.

8. A data communications network according to claim 7, wherein each said processor computer includes a message routing computer for connecting a first processor computer having a first extended address to a second processor computer having a second extended address determined solely by the extended addresses of a message source processor computer and a message destination processor computer.

9. A data communications network according to claim 8, wherein a sequence of addresses formed by said message routing computers in said process computers provides a message path along the least number of said transmission lines between said source processor computer and said destination processor computer.

10. A data communications network according to claim 6, wherein said vertex symmetric network is selected from graphs $C_d(k)$, where d is the number of transmission lines in each transmission line set connected to each said processor computer and the least number of transmission lines connecting any two said processor computers in said network is at most k, where $d \geq k$.

11. A data communications network according to claim 6 where said vertex symmetric network is selected from graphs $C_d(k,-1)$, where d is one more than the number of transmission lines in each transmission line set connected to each said processor computer and the least number of transmission channels connecting any two said processor computers in said network is at most $k+1$, where $d \geq k \geq 4$.

12. A communications network according to claim 11, where no processor computer has a transmission line connected to another processor computer to form a network edge in a direction $d_1$.

* * * * *